US006817305B2

(12) United States Patent
Opitz

(10) Patent No.: US 6,817,305 B2
(45) Date of Patent: Nov. 16, 2004

(54) DEVICE FOR TRANSPLANTING TREES OR SHRUBS

(76) Inventor: Dieter Opitz, Waldhausstrasse 8, D-91180 Heideck (DE)

( * ) Notice: Subject to any disclaimer, the term of this patent is extended or adjusted under 35 U.S.C. 154(b) by 0 days.

(21) Appl. No.: 10/341,914

(22) Filed: Jan. 14, 2003

(65) Prior Publication Data

US 2004/0040481 A1 Mar. 4, 2004

(30) Foreign Application Priority Data

Aug. 27, 2002 (DE) ...................... 202 13 090 U

(51) Int. Cl.[7] .......................... A01G 23/02; A01C 11/02
(52) U.S. Cl. ........................................ 111/101; 37/302
(58) Field of Search .......................... 37/303, 404, 405, 37/406, 903, 302; 47/1.01 P; 111/100, 101, 103, 92

(56) References Cited

U.S. PATENT DOCUMENTS

| | | | | |
|---|---|---|---|---|
| 4,226,033 A | * | 10/1980 | DeHaan | 111/101 |
| 4,351,253 A | * | 9/1982 | Dahlquist | 111/101 |
| 5,081,941 A | * | 1/1992 | Weeks | 111/101 |
| 5,129,336 A | * | 7/1992 | Vos | 111/101 |
| 5,459,952 A | * | 10/1995 | Tillaart et al. | 37/302 |
| 5,600,904 A | * | 2/1997 | Bowling | 37/302 |
| 6,253,690 B1 | * | 7/2001 | Cox | 111/101 |
| 6,722,296 B2 | * | 4/2004 | Reilly | 111/101 |

FOREIGN PATENT DOCUMENTS

DE          100 01 078          5/2001

* cited by examiner

Primary Examiner—Robert E. Pezzuto
Assistant Examiner—Nathan Mammen
(74) Attorney, Agent, or Firm—Collard & Roe, P.C.

(57) ABSTRACT

A device serves for transplanting trees or shrubs. The device comprises a carrier that is capable of encircling the tree or the shrub. Circularly arced slideways are supported on the carrier, and spades are adjustably supported along the slideways. The spades can be adjusted from a digging position, in which they encircle the tree or shrub, to a transport position, in which they substantially complement each other to form a bowl. So that the spades can be easily adjusted, the slideways are accommodated in guide boxes. The guide boxes are supported on the carrier so that they can be adjusted independently of each other.

7 Claims, 2 Drawing Sheets

DEVICE FOR TRANSPLANTING TREES OR SHRUBS

CROSS REFERENCE TO RELATED APPLICATIONS

Applicant claims priority under 35 U.S.C. §119 of German Application No. 202 13 090.8 filed on Aug. 27, 2002.

BACKGROUND

The invention relates to a device for transplanting trees or shrubs. A device for transplanting trees or shrubs is shown in DE 100 01 078 D1. This device has two spades that can be adjusted and moved between a closed position and an open position by servo-drives. The spades are first driven into an open position, in which they encircle a tree or shrub. By hydraulically adjusting the spades to the closed position, a ball-shaped part of the soil underneath the tree or shrub is cut out. Any roots that may protrude from the ball of soil are cut off. With the spades in the closed position, the ball of soil and the tree can be lifted from the around and transported to a new intended location.

This device has been successfully used in practice and is the starting point of the present innovation. In practical applications, the cutting blades of the spades are subjected to substantial wear, requiring them to be reground from time to time. However, when the grinding treatment of the cutting blades is performed frequently, the spades are shortened, creating a gap between the cutting blades when they are in the closed position. A root protruding into this region can no longer be severed by the spades, and digging the ball from the soil is more difficult if not impossible.

The invention provides a device of the type specified above that has an increased operating time and simple handling.

SUMMARY

The device as defined by the invention comprises a carrier preferably structured in the form of a ring. The carrier has two parts that can be separated from each other so that the carrier may be set in a position in which it encircles a tree or bush. Circularly curved slideways are supported on the carrier along with spades, which can be set to either a digging position or a transport position. In the digging position, the spades are retracted to such an extent that the downwardly directed tips are positioned outside of, or aligned below the carrier. These tips encircle the tree or shrub with as much radial spacing as possible. In the transport position, the spades substantially complement each other to form a substantially hemispherical bowl. The a can be removed from the ground. If roots of the tree or shrub protrude from this ball, they are severed as the spades are adjusted and driven from the digging position into the transport position.

It is important that the spades are correctly aligned with each other and form no gaps when in the transport position. To prevent this, the device has guide boxes in which the slideways are accommodated. These slideways are supported on the carrier so that they can be adjusted independently of each other. Thus the individual spades can be precisely adjusted by setting the guide boxes. The cutting blades of the spades are subjected to relatively high wear especially if the device is operated in soil rich in rocks. After the cutting blades of the spades have been reground a number of times, readjusting the guide boxes will compensate for the gap produced between the spades. The device can be operated over a very long time in spite of frequent regrinding of the spades. Only the guide boxes need to be adjusted in this process, which substantially simplifies the operation of the device.

The guide boxes may be support on the carrier in a displaceable manner. However, this would require relatively long adjustment lengths, and thus relatively large-sized adjusting elements. In forming a compact structure of the device, it is more advantageous if the guide boxes are pivotally-mounted on the carrier. Preferably, a bolt supported on the carrier serves as the pivot bearing. Relatively short adjusting means are capable of engaging the upper area of the guide boxes, and the guide bar provides for a sizeable distance of adjustment on the tips of the spades. The clear space within the carrier is not impaired in any way by the adjusting means of the guide boxes. This is important because the tree or shrub has to be accommodated in the clear space when it is dug out.

It is advantageous if the guide boxes are pivotally-mounted on the carrier so that they can be pivoted around a substantially horizontal axis aligned in the peripheral direction. This alignment of the axis of pivot results in an optimal adjustment of the spades. These spades are only driven against each other or away from each other when they are adjusted. The axis of pivot is preferable disposed in the area of the lower end of the carrier.

The guide boxes are preferably fixed on the carrier by least one screw bolt so that there is a safe transmission of forces to the spades. These screw bolts form a safety device for the guide boxes, so that their adjustment is maintained when high forces are acting on the spades in operation. This screw bolt connects the guide box to at least one flange of the carrier for an optimal securing of the guide box on the carrier. The guide box is preferably engaged between two flanges of the carrier. The screw bolt penetrates the guide box and both flanges and clamps these parts against one another. During operation, the screw bolt is exclusively stressed by shearing, so that it is capable or transmitting high forces.

To assure a simple and precise adjustment of the guide boxes, the screw bolt is actively connected to an adjusting mechanism acting substantially radially in relation to the carrier. With the screw bolt released, the adjusting mechanism permits an exact adjustment of the guide boxes. After all the guide boxes have been adjusted, the screw bolts are again screwed to the flanges of the carrier, so that the adjusting mechanism is relieved. Accordingly, the adjusting mechanism has to carry the weight of the guide boxes and spades only during the actual adjusting process.

A simple embodiment of the adjusting mechanism is in the form of a threaded bold that is aligned radially in relation to the carrier. The threaded bolt is supported on the carrier. It is not important for the threaded bolt no engage a threaded bore of a component that is connected in a fixed manner with the guide box or the carrier. By turning the threaded bolt, a relative movement is produced between the carrier and the guide box that can be used for adjusting the guide box. The threaded bolt preferably has at least one surface for engaging a wrench to easily introduce the required torque into the threaded bolt.

Another feature of the adjusting mechanism comprises at least two threaded bolts that are supported one in the other. These threaded bolts have oppositely directed threads. The inner threaded bolt engages a female thread of the outer threaded bolt, wherein a setting movement of the outer threaded bolt leads to an adjustment of the inner threaded bolt over twice the distance. This provides for relatively long adjustment movements, whereas the size of the overall structure of the adjusting mechanism remains small. The space available above and below the carrier can be optimally utilized without impairing the clear space formed by the carrier.

Another feature of the adjusting device, comprises a first receptacle that is engaged by the screw bolts for fixing the guide boxes. This receptacle is transversely penetrated by a threaded bore that receives the threaded bolt of the adjusting mechanism. Thus there is formed a particularly compact structure of the adjusting mechanism. The threaded bore of the receptacle preferably receives the outer threaded bolt of the adjusting mechanism.

Finally, it is favorable if a second receptacle is supported on the threaded bolt, preferably on the inner threaded bolt. This second receptacle is preferably formed by a piece of tubing that is connected with the threaded bolt and extends transversely in relation to the latter. This tubing is penetrated by a bearing pin. This bearing pin is preferably formed by the pivot hook fixing the guide box. This pivot hook is supported on the carrier, specifically on the flanges of the carrier, or on the guide box, forming a simple and effective abutment for the adjusting device.

BRIEF DESCRIPTION OF THE DRAWINGS

Other objects and features of the present invention will become apparent from the following detailed description considered in connection with the accompanying drawings which disclose one embodiment of the present invention. It should be understood, however, that the drawings are designed for the purpose or illustration only and not as a definition of the limits of the invention.

In the drawings, wherein similar reference characters denote similar elements throughout the several views.

DETAILED DESCRIPTION

Figure 1:
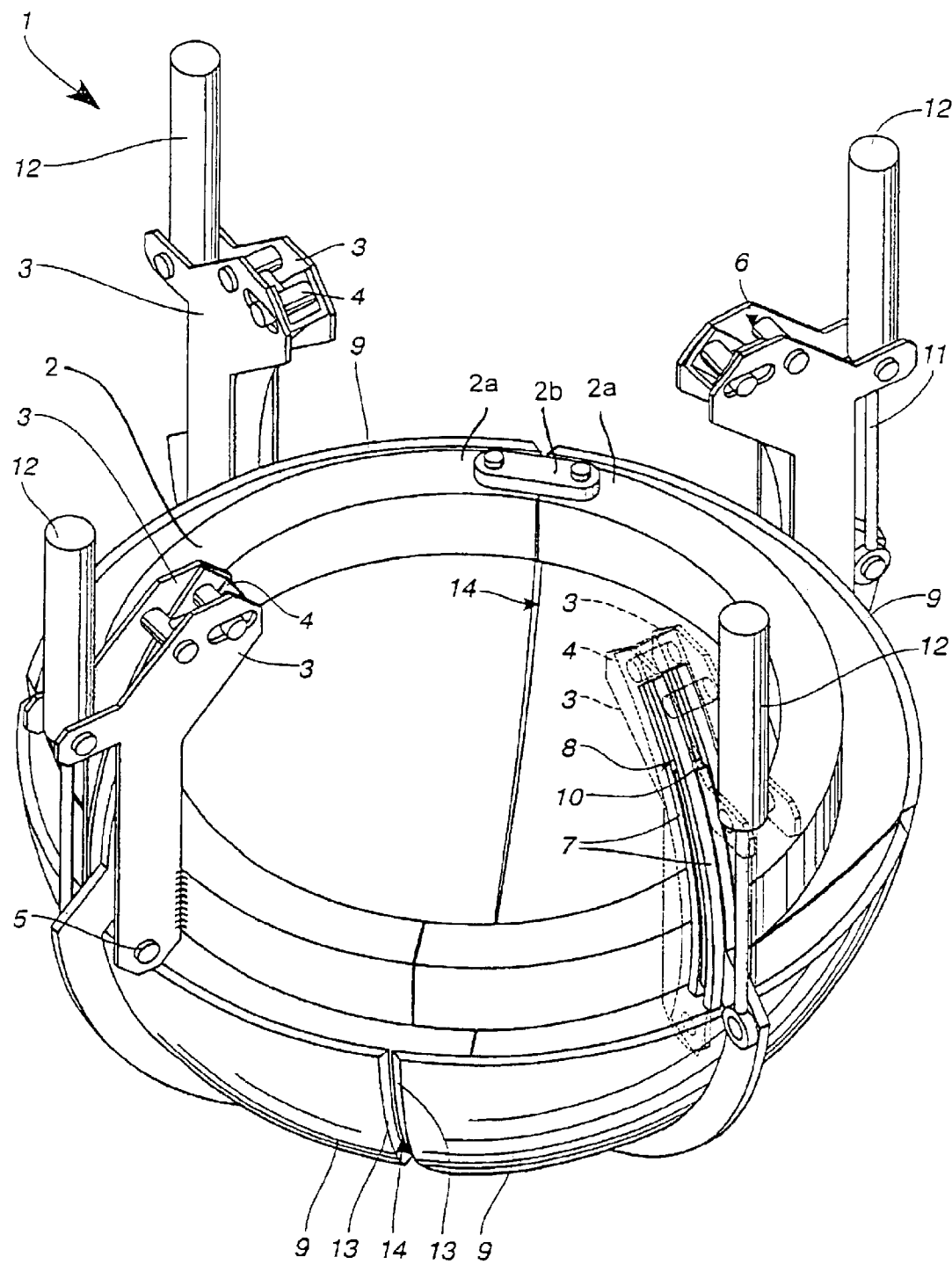
FIG. 1 is a three-dimensional representation of a device for transplanting trees or shrubs.

Referring to the drawings, FIG. 1 shows a device 1 that transplants trees or shrubs (not shown). Device 1 comprises a carrier 2 that is substantially ring shaped. Carrier 2 consists of two components 2a, which are connected to one another by a joint 2b. Components 2a can be spread apart by means of a hydraulic cylinder (not shown), to drive carrier 2 into a position in which it encircles the tree or shrub. Carrier has flanges 3, between which guide boxes 4 are supported. Guide boxes 4 are pivotally connected with flanges 3 on the bottom side of the carrier via a bolt 5, which forms a pivot joint for guide box 4. On the top side of the carrier, guide box 4 is engaged by an adjusting mechanism 6 that creates a pivot movement of guide box 4 around bolt 5. Since each guide box 4 has its own adjusting mechanism 6, individual guide boxes 4 can be individually adjusted independently of each other.

One of the guide boxes 4, together with associated flanges 3, is indicated only by broken lines, so that the elements installed in guide boxes 4 are visible. Four sliding rails 7, which are preferably made of plastic, are supported in each of the guide boxes 4. These sliding rails jointly form a slideway 8. Slideways 8 are in the shape of a circular arc. A spade 9 is associated with each guide box 4. Spade 9 engages associated slideway 8 of guide box 4 with a sliding runner 10. In this way, each spade 4 is pivotably supported in guide box 4.

On the outer side, spades 9 are each engaged by a piston rod 11 of a hydraulic cylinder 12. With the help of hydraulic cylinder 12, spade 9 cab be pivoted along slideway 8. In this way, spades 9 can be driven from the transport position shown in FIG. 1, into a retracted digging position shown by a broken line. When spades 9 are in the digging position, they are disposed radially outside of carrier 2, so that they are capable of encircling the tree or shrub to be transplanted. In the transport position shown, on the other hand, spades 9 complement each other, forming a substantially hemispherical bowl.

Spades 9 have cutting blades 13 to easily penetrate the ground, or to sever roots of the tree or shrub to be transplanted. Cutting blades 13 have to be reground from time to time, so that a gap 14 may be produced between individual spades 9. To avoid gap 14, guide boxes 4, and thus spades 9, can be adjusted independently of each other with adjusting mechanism 6.

Figure 2:
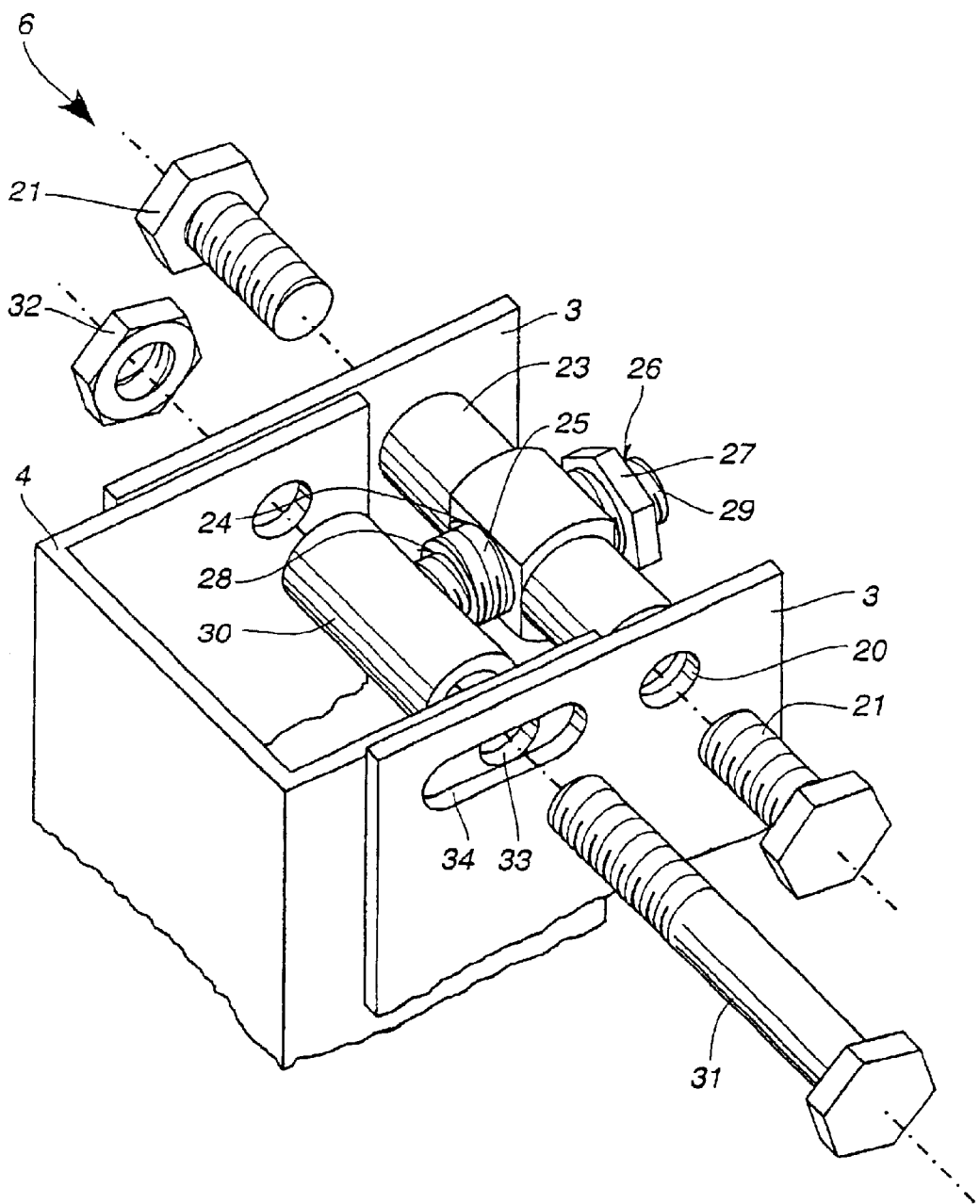
FIG. 2 is a three-dimensional representation of an adjusting mechanism for a guide box of a device for transplanting trees or shrubs.

The structure and the mode of operation or adjusting mechanism 6 are explained in greater detail with the help of FIG. 2. Bores 20 are in flanges 3 of carrier 2, wherein bore 20, are aligned with each other and receive screw bolts 21. Screw bolts 21 form an abutment for the adjusting mechanism 6 jointly with bores 20. Screw bolts 21 engage threaded bores of a first receptacle 23, which are aligned with each other. First receptacle 23 is pivot-mounted between flanges 3 and transversely penetrated by a further threaded bore 24, into which a first threaded bolt 25 is screwed. On its end 26, first threaded bolt 25 has a hexagonal component 27, which serves for being engaged by a corresponding wrench, so that first threaded bolt 25 can be turned.

First threaded bolt 25 is axially penetrated by a threaded bore 28, which is engaged by a second threaded bolt 29 with a thread directed oppositely to threaded bolt 25. A second receptacle 30, preferably a piece of tubing, is welded to second threaded bolt 29. Second receptacle 30 acts as a connection with guide box 4 and is penetrated by a screw 31 cooperating with a nut 32. Screw 31 extends through bores 33 of guide box 4 and thus acts to connect second receptacle 30 with guide box 4 in a force-locked manner. In addition, screw 31 penetrates two flanges 3 through oblong bores 34, so that in the tightened position, screw 31 secures guide box 4. This design assures that when device 1 is in operation, the setting adjusted with adjusting mechanism 6 remains intact without overly stressing adjusting mechanism 6.

To adjust guide boxes screw 31 or nut 32 and screw bolts 21 are first loosened to release the clamped hold between guide box 4 and flanges 3. Subsequently, first threaded bolt 25 is turned on hexagonal component 27, for example, with the help of a fork wrench, so that first threaded bolt is caused to axially move in threaded bore 24 of first receptacle 23. Since second receptacle 30 is secured against turning by screw 31 plugged through it, second threaded bolt 29 is prevented from jointly turning with first threaded bolt 25, so that said two threaded bolts 25, 29 are caused to move axially against each other as well. Threads of two threaded bolts 25, 29 are directed in opposite directions, so that the axial movements of thrust caused by two threaded bolts 25, 29 are added up. Piece or tubing 30 and guide box 4 connected therewith accordingly travel a distance of adjustment twice as long as the one traveled by first threaded bolt 25.

After all of spades 9 have been adjusted relative to each other in the manner described above, screws 31 or nuts 32 and screw bolts can be tightened again to secure force-locked connection between flanges 3 and guide boxes 4. The forces of thrust exerted by hydraulic cylinders 12 are therefore absorbed by this force-locked connection and kept away from adjusting mechanism 6. Since screw 31 penetrates flanges 3 through the oblong holes 34, the design assures adequate freedom of movement of guide box 4.

Device 1 is preferably mounted on an excavator, a loader, or a bobcat. Removing the tree or shrub is a two step process wherein the excavator first lowers device 1 to penetrate the soil by about 10–20 cm. Spades 9 are then hydraulicly moved into the closed position forming a substantially hemispherical cup below the tree or shrub.

Accordingly, while a single embodiment of the present invention has been shown and described, it is to be understood that many changes and modifications may be made thereunto without departing from the spirit and scope of the invention as defined in the appended claims.

What is claimed is:

1. A device for transplanting a tree or shrub comprising:
   at least one carrier capable of encircling the tree or shrub;
   a plurality of guide boxes independently and adjustably supported on said carrier;
   a plurality of circularly curved slideways supported on said carrier, wherein each of said plurality of circulary curved slideways is disposed in one of said plurality of guide boxes;
   a plurality of spades coupled to said carrier and comprising a sliding runner disposed in each of said plurality of circularly curved slideways, wherein said plurality of spades is adjustable between a digging position, where said plurality of spades encircles the tree or shrub, and a transport position, where said plurality of spades substantially compliment each other to form a bowl;
   a plurality of flanges fixedly coupled to said carrier and extending from said carrier in a substantially radial direction in relation to said carrier, wherein each of said plurality of guide boxes is disposed between two of said plurality of flanges;
   a plurality of screw bolts, at least one of which penetrates said two of said plurality of flanges and said guide box disposed therebetween;
   a plurality of adjusting mechanisms wherein at least one of said plurality of adjusting mechanisms is connected with each screw bolt, and wherein each of said plurality of adjusting mechanisms acts in a substantially radial manner in relation to said carrier.

2. The device according to claim 1, wherein said plurality of guide boxes are pivot-mounted on said carrier.

3. The device according to claim 2, wherein said plurality of guide boxes can be pivoted around an axis which is aligned substantially horizontal and in a peripheral direction of said carrier.

4. The device according to claim 1, wherein each of said plurality of adjusting mechanisms comprises at least one threaded bolt supported on said carrier, wherein said threaded bolt is aligned substantially radially in relation to said carrier.

5. The device according to claim 1, wherein each of said plurality of adjusting mechanisms comprises at least two threaded bolts engaged one inside the other, wherein said at least two threaded bolts have oppositely directed threads.

6. A The device according to claim 1 wherein each of said plurality of adjusting mechanisms comprises a first receptacle in which said at least one screw bolt is fixed, and wherein said first receptacle is penetrated by a threaded bore receiving said at least one threaded bolt.

7. A The device according to claim 1, wherein each of said plurality of adjusting mechanisms further comprises a second receptacle connected to said at least one threaded bolt, wherein one of said plurality of screw bolts is a bearing pin that penetrates said second receptacle, said two of said plurality of flanges and said guide box disposed therebetween.

\* \* \* \* \*